United States Patent [19]

Treu

[11] Patent Number: 4,744,808
[45] Date of Patent: May 17, 1988

[54] LIQUID LEVEL SENSING AND CONTROL

[75] Inventor: Dennis M. Treu, Morrison, Colo.

[73] Assignee: Cobe Laboratories, Inc., Lakewood, Colo.

[21] Appl. No.: 925,736

[22] Filed: Oct. 30, 1986

[51] Int. Cl.[4] .......................................... B01D 19/00
[52] U.S. Cl. ...................................... 55/165; 55/208; 55/219; 73/313; 137/412; 340/624
[58] Field of Search ................. 55/160, 165–170, 55/208, 216, 219; 73/290 R, 308, 313; 137/173, 412; 340/624, 618, 623

[56] References Cited

U.S. PATENT DOCUMENTS

| | | | |
|---|---|---|---|
| 1,490,462 | 4/1924 | Gill | 55/168 |
| 2,825,422 | 3/1958 | Schoenfeld | 55/168 X |
| 3,394,530 | 7/1968 | O'Neill et al. | 55/166 |
| 3,681,028 | 8/1972 | Mason | 137/412 X |
| 3,966,437 | 6/1976 | DeWolf et al. | 137/412 X |
| 4,056,979 | 11/1977 | Bongort et al. | 73/313 |
| 4,162,974 | 7/1979 | Pernic | 55/170 X |
| 4,186,419 | 1/1980 | Sims | 73/313 X |
| 4,187,262 | 2/1980 | Fessler et al. | 137/409 X |
| 4,284,904 | 8/1981 | Tetro | 340/624 X |
| 4,348,280 | 9/1982 | George et al. | 55/165 X |
| 4,361,835 | 11/1982 | Nagy | 340/624 |
| 4,371,385 | 2/1983 | Johnson | 55/190 |
| 4,384,184 | 5/1983 | Alvarez | 340/624 X |
| 4,466,284 | 8/1984 | Dumery | 73/313 |
| 4,589,282 | 5/1986 | Dumery | 73/313 |

Primary Examiner—Robert Spitzer

[57] ABSTRACT

A fluid flow chamber including a housing defining a chamber, a chamber inlet and a chamber outlet for flow of liquid therethrough, a float in the chamber, and a magnet and magnetic position sensor, one of which is carried by the float for movement with the change in liquid level in the chamber, the other of which is fixedly mounted with respect to the housing.

13 Claims, 1 Drawing Sheet

LIQUID LEVEL SENSING AND CONTROL

FIELD OF THE INVENTION

The invention relates to sensing and controlling the level of liquid in a fluid flow chamber.

BACKGROUND OF THE INVENTION

It may be desirable to sense and control the level of a liquid flowing through a fluid flow chamber. For example, in a deaeration chamber of dialysate preparation apparatus, if the level of liquid goes below the outlet, air removed from the liquid will be undesirably pumped downstream with the water.

SUMMARY OF THE INVENTION

The invention features in general using a float, a magnet and a magnetic position sensor to determine the level of a liquid in a fluid flow chamber.

In preferred embodiments, there is a vertically oriented guide support along which the float travels as the liquid level in the chamber changes; the magnetic position sensor is carried by the guide support, and there are two magnets in the float on both sides of the guide support; the magnets have their north and south poles vertically arranged with respect to each other, the north pole of one magnet being on top and the north pole of the other magnet being on the bottom; and the guide support is attached to the top of the chamber housing.

Other advantages and features of the invention will be apparent from the following description of the preferred embodiment thereof and from the claims.

DESCRIPTION OF THE PREFERRED EMBODIMENT

The drawings will be briefly described first.

Drawings

Structure

Figure 1:
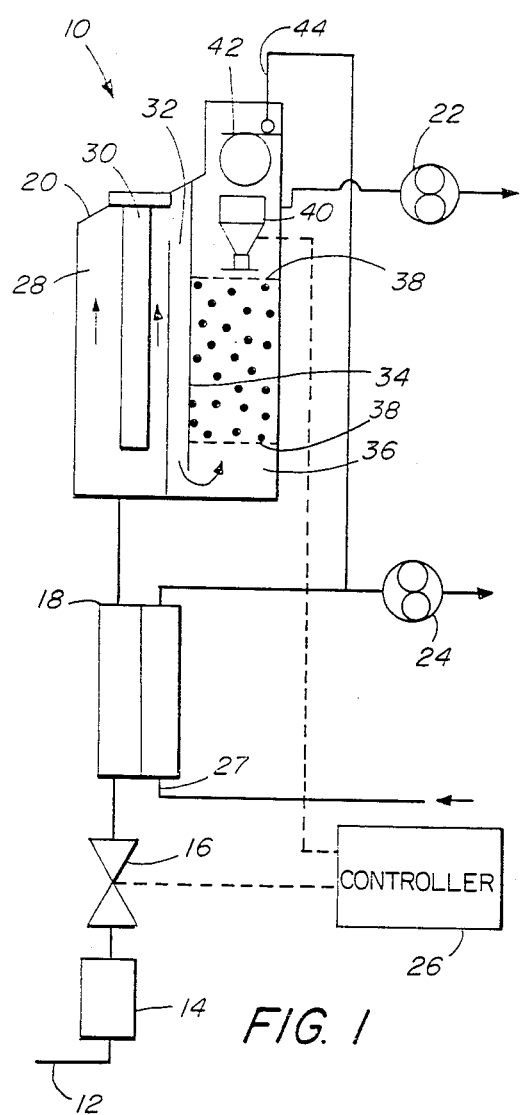
FIG. 1 is a schematic of a deaeration portion of a dialysate preparation machine.
Figure 2:
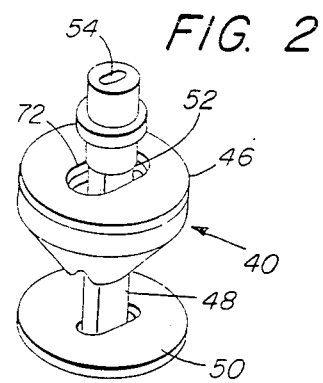
FIG. 2 is a diagrammatic perspective view of a liquid level sensor of a deaertion chamber of the FIG. 1 apparatus.
Figure 3:
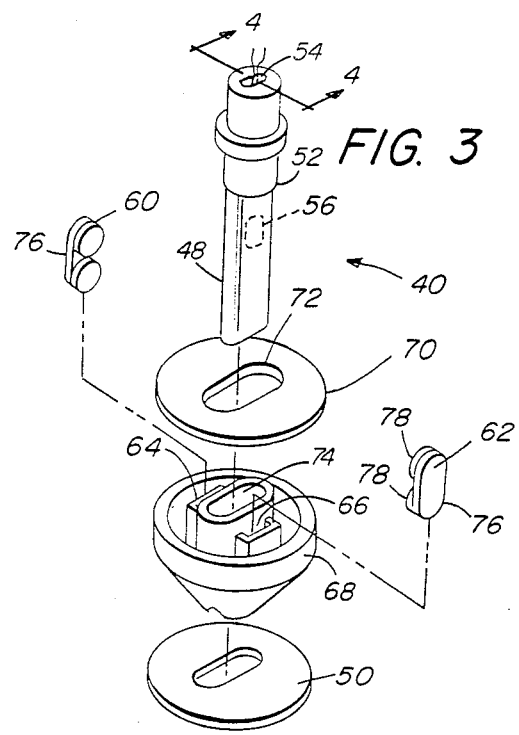
FIG. 3 is an exploded perspective view of the FIG. 2 level sensor.
Figure 4:
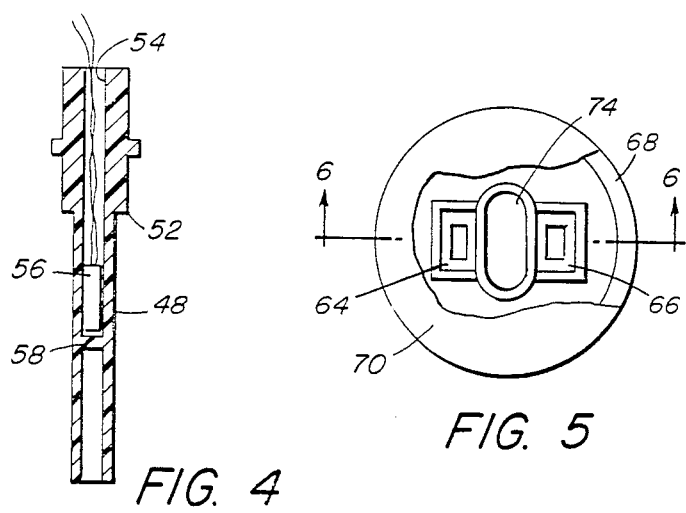
FIG. 4 is a vertical sectional view, taken at 4—4 of FIG. 3, of a guide support of the FIG. 2 level sensor.
Figure 5:
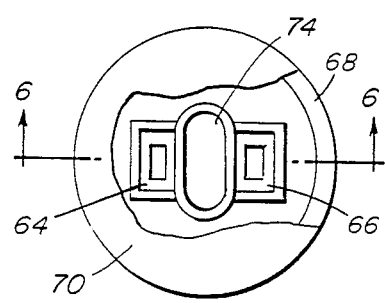
FIG. 5 is a top view, partially broken away, of a float of the FIG. 2 level sensor.
Figure 6:
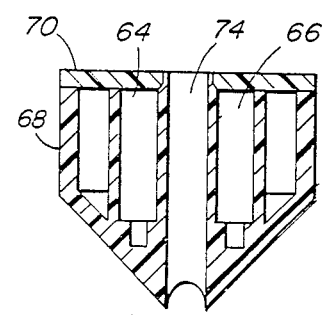
FIG. 6 is a vertical sectional view, taken at 6—6 of FIG. 5, of the FIG. 5 float.

Referring to FIG. 1, there is shown apparatus 10 for deaerating water used in a dialysate preparation and supply machine of the type shown in Johnson U.S. Pat. No. 4,371,385. It includes inlet 12 for receiving tap water, inlet pressure regulator 14 (adjusted to have an outlet pressure of 6 psi when its outlet is not connected to a further pressure reducer), two-position (open-closed) solenoid valve 16, heat exchanger 18, heater/deaerator 20, deaeration pump 22, vacuum/waster pump 24, and electronic controller 26, connected to receive signals from level sensor 40 and to control valve 16 and control other components (not shown) of the dialysate preparation machine. Pumps 22, 24 are positive displacement gear pumps.

Heater/deaerator 20 includes tubular flow passage 28, which surrounds heating element 30 and overflows into passage 32 on the left side of baffle 34 between the heating zone in passage 28 and deaeration chamber 36. Deaeration chamber 36 includes polypropylene particles (spheres and cylinders approximately 0.090" in diameter) that are prevented from flowing beyond screens 38 located below level sensor 40. At the top of deaeration chamber 36 is bleed valve 42 blocking flow of liquid through gas outlet 44 connected to vacuum/waster pump 24.

Referring to FIGS. 2-6, level sensor 40 includes float 46 mounted for floating up and down along vertical guide support 48 between base plate 50 and overhanging portion 52 at the top of guide support 48. Guide support 48 is mounted at the top of the housing for deaeration chamber 36 and has central bore 54 in which hall effect sensor 56 (an integrated circuit available from Sprague Electric Company, Concord, N.H., under the trade designation UGN 3501T) is received and supported by horizontal floor 58.

Magnets 60, 62 are received within pockets 64, 66 of base 68 of float 46. Top 70 covers the top of base 68 and has hole 72 therethrough aligned with central bore 74 of base 68, for receiving vertical guide support 48. Magnets 60, 62 are each made of shunt bar 76 (0.500" long, 0.062" thick, 0.187" wide with full radius ends and made of CR steel, ASTM A366) and two rare earth metal magnetic disks 78 (0.062" thick, 0.187" diameter, samarium cobalt grade 18, magnetized to 8700 internal gauss, approximately 1200 gauss at surface).

Operation

Water entering from inlet 12 passes through pressure regulator 14, which provides protection from large line pressure variations, and solenoid valve 16, which is alternateley opened and closed and has a 6-second period. The duty cycle of valve 16 is controlled by controller 26 so as to be open a portion of the 6-second period depending upon the liquid level indicated by the output voltage from level sensor 40.

Water flows through heat exchanger 18, receiving heat from the spent dialysate, and enters heating passage 28, flows upward in it, spills over into passage 32 and flows under baffle 34 into deaeration chamber 36. The liquid in heater/deaerator 20 is subjected to negative pressure by deaeration pump 22, which pumps at a fixed rate higher than the inflow rate, and by vacuum pump 24. Pump 22 is operated at a fixed voltage to pump at a constant rate (the value of which can be adjusted by the operator), and pump 24 is operated to pull on the air in chamber 36 to maximize the vacuum in chamber 36, without overpowering pump 22. The negative pressure and increased temperature cause volatilization of dissolved gas from the liquid. Plastic particles between screens 38 provide nucleation sites at which air bubbles form. Gas accumulating above the liquid surface passes through valve 44 and pump 24 while average liquid level is maintained constant by level sensor 40.

Magnets 78 are spaced from each other, thereby increasing the range of liquid levels in chamber 36 over which level sensor 40 has a linear output. The opposite polarity between opposing magnets and the use of rare earth magnets cause a concentrated magnetic flux at the location of sensor 56 between opposing magnets 78, contributing to accuracy of sensor 40. The level in chamber 36 is constantly changing owing to the cycling of valve 16, but the level is kept within the desired range. The level of liquid is maintained above the active elements of heating element 30.

Deaerated water supplied by pump 22 to the remainder of the hydraulic circuitry of the dialysate preparation machine is mixed with dialysate concentrate and provided to the dialysate side of a dialyzer. Spent dialysate returns from the dialyzer to inlet 27 of heat exchanger 18, and is removed via vacuum/waster pump 24.

Other Embodiments

Other embodiments of the invention are within the scope of the following claims. For example, level sensor 40 could be connected to a digital switch that switches to high/low outputs as its threshold voltage is passed, and used, for example, in an air separator in a spent dialysate flow path upstream of a balance chamber.

What is claimed is:

1. A fluid flow chamber and a controller for flow therethrough comprising
a housing defining a chamber, a chamber inlet and a chamber outlet for flow of liquid therethrough,
a float in said chamber,
a magnet,
a magnetic position sensor that provides an output signal with a magnitude related to the strength of a magnetic field to which it is subjected,
  one of said magnet and magnetic position sensor being carried by said float for movement with the change in liquid level in said chamber,
  the other of said magnet and magnetic position sensor being fixedly mounted with respect to said housing,
  said magnet being oriented with respect to said sensor so as to subject said sensor to a magnetic field that continuously varies in strength as a function of level of liquid in said chamber,
  thereby causing an output signal at said sensor that continuously varies in magnitude as a function of level,
an actuator hydraulically connected to said chamber so as to affect flow through said chamber, and
an electronic controller connected to receive said output signal of said sensor and to provide a control signal to said actuator based upon the magnitude of said output signal.

2. The fluid flow chamber and controller of claim 1 further comprising a vertically oriented guide support along which said float travels as the liquid level in said chamber rises and falls.

3. The chamber and controller of claim 2 wherein said float has an opening through which said guide support passes.

4. The chamber and controller of claim 3 wherein said magnetic position sensor is carried by said guide support, and there are two magnets carried by said float on opposite sides of said magnetic position sensor.

5. The chamber and controller of claim 4 wherein said magnets have north and south poles vertically oriented with respect to each other and spaced from each other by a gap between them along vertical axes, and one said magnet has its north pole on the top, and the other said magnet has its north pole on the bottom.

6. The chamber and controller of claim 4 wherein said magnets are each made of individual magnetic elements mounted on a vertically oriented shunt bar, one said individual magnetic element having its north pole against a said shunt bar and the other said individual magnetic element having its south pole against said shunt bar.

7. The chamber and controller of claim 3 wherein said guide support has stop members larger in size than said opening to retain said float between them.

8. The chamber and controller of claim 2 wherein said guide support is mounted at the top of said housing.

9. The chamber of claim 1 wherein said chamber and controller has a gas outlet at the top of said housing for removing gas volatilized from said liquid.

10. The chamber and controller of claim 9 further comprising a divider in said chamber dividing it into a deaeration zone including said float and an upstream heater zone.

11. The chamber and controller of claim 1 wherein said actuator comprises a valve that controls flow into said inlet, and wherein said control signal controls a duty cycle of said valve so as to be open a portion of the duty cycle depending upon the liquid level indicated by the magnitude of said output signal.

12. A fluid flow chamber comprising
a housing defining a chamber, a chamber inlet and a chamber outlet for flow of liquid therethrough,
a float in said chamber,
a magnet,
a magnetic position sensor that provides an output signal with a magnitude related to the strength of a magnetic field to which it is subjected,
  one of said magnet and magnetic position sensor being carried by said float for movement with the change in liquid level in said chamber,
  the other of said magnet and magnetic position sensor being fixedly mounted with respect to said housing,
  said magnet being oriented with respect to said sensor so as to subject said sensor to a magnetic field that continuously varies in strength as a function of level of liquid in said chamber,
  thereby causing an output signal at said sensor that continuously varies in magnitude as a function of level,
  said magnet having its north and south poles vertically oriented with respect to each other and spaced from each other by a gap between them along a vertical axis.

13. The chamber of claim 12 wherein there are two said magnets, one on each side of said sensor, and wherein one said magnet has its north pole on the top, and the other said magnet has its north pole on the bottom.

* * * * *